(12) United States Patent
Landt et al.

(10) Patent No.: US 7,908,252 B1
(45) Date of Patent: Mar. 15, 2011

(54) SYSTEM AND METHOD FOR VERIFYING PATHS TO A DATABASE

(75) Inventors: Matthew Eugene Landt, Round Rock, TX (US); Jack Basiago, Toney, AL (US)

(73) Assignee: Crossroads Systems, Inc., Austin, TX (US)

( * ) Notice: Subject to any disclaimer, the term of this patent is extended or adjusted under 35 U.S.C. 154(b) by 344 days.

(21) Appl. No.: 12/051,555

(22) Filed: Mar. 19, 2008

(51) Int. Cl.
*G06F 17/30* (2006.01)

(52) U.S. Cl. ........................................................ 707/687

(58) Field of Classification Search .................. 707/687, 707/796
See application file for complete search history.

(56) References Cited

U.S. PATENT DOCUMENTS

| | | | |
|---|---|---|---|
| 5,058,000 A | 10/1991 | Cox et al. | |
| 5,499,371 A | 3/1996 | Henninger et al. | |
| 5,572,724 A | 11/1996 | Watanabe et al. | |
| 5,692,129 A | 11/1997 | Sonderegger et al. | |
| 5,787,412 A | 7/1998 | Bosch et al. | |
| 5,859,978 A | 1/1999 | Sonderegger et al. | |
| 5,873,093 A | 2/1999 | Williamson et al. | |
| 5,940,819 A * | 8/1999 | Beavin et al. .......................... | 1/1 |
| 6,047,312 A | 4/2000 | Brooks et al. | |
| 6,189,012 B1 | 2/2001 | Mital et al. | |
| 6,279,005 B1 | 8/2001 | Zellweger | |
| 6,418,428 B1 | 7/2002 | Bosch et al. | |
| 6,446,059 B1 | 9/2002 | Berger et al. | |
| 6,965,903 B1 | 11/2005 | Agarwal et al. | |
| 7,036,127 B2 | 4/2006 | Cheng et al. | |
| 7,127,474 B2 | 10/2006 | Williamson et al. | |
| 7,178,129 B2 | 2/2007 | Katz | |
| 7,194,664 B1 | 3/2007 | Fung et al. | |
| 7,383,294 B1 * | 6/2008 | Tamer et al. ................... | 707/810 |
| 2001/0049682 A1 * | 12/2001 | Vincent et al. ................ | 707/100 |
| 2002/0196744 A1 | 12/2002 | O'Connor | |
| 2003/0187813 A1 | 10/2003 | Goldman et al. | |
| 2004/0177319 A1 | 9/2004 | Horn | |
| 2005/0081037 A1 * | 4/2005 | Kumagai et al. .............. | 713/175 |
| 2005/0091183 A1 | 4/2005 | Cunningham et al. | |
| 2005/0097108 A1 | 5/2005 | Wang et al. | |
| 2005/0102254 A1 * | 5/2005 | Marr et al. ........................ | 707/1 |
| 2005/0160090 A1 * | 7/2005 | Harjanto ........................... | 707/3 |
| 2005/0165776 A1 | 7/2005 | Focazio et al. | |
| 2006/0064412 A1 | 3/2006 | Cunningham et al. | |
| 2006/0123043 A1 | 6/2006 | Kwon | |
| 2007/0050399 A1 | 3/2007 | George et al. | |
| 2007/0094302 A1 | 4/2007 | Williamson et al. | |
| 2008/0114803 A1 * | 5/2008 | Chinchwadkar et al. ..... | 707/102 |

\* cited by examiner

*Primary Examiner* — James Trujillo
*Assistant Examiner* — Jorge A Casanova
(74) *Attorney, Agent, or Firm* — Sprinkle IP Law Group

(57) ABSTRACT

Embodiments provide systems and methods for verifying paths to databases. A method for identifying paths to a database may comprise opening a database in a set of databases utilizing a known path to the database, creating an object in the database and checking for the object utilizing one or more paths in a set of paths to databases, wherein paths in the set of paths corresponding to a database containing the alias are paths to the database. By repeating the above process for multiple databases, paths to multiple databases may be verified.

20 Claims, 4 Drawing Sheets

| | IP | PORT | DB TYPE | DB NAME | |
|---|---|---|---|---|---|
| 1 | 192.168.1.1 | 50000 | DB2 | TOOLSDB | 410 |
| 2 | 192.168.1.1 | 50000 | DB2 | BACKUPDB | |
| 3 | 192.168.1.3 | 50001 | DB2 | TOOLSDB | 420 |
| 4 | 10.0.0.4 | 50002 | DB2 | REMOTEDB | 430 |
| 5 | 192.168.1.1 | 1522 | ORACLE | BACKUPDB | |
| 6 | 192.168.1.1 | 1522 | ORACLE | PRODDB | |
| 7 | 192.168.1.1 | 1433 | MS SQLServer | PRODDB | |

SYSTEM AND METHOD FOR VERIFYING PATHS TO A DATABASE

TECHNICAL FIELD

Embodiments of various methods and systems for verifying paths to one or more databases are disclosed. More particularly, embodiments include methods and systems for identifying paths to a database and verifying the validity of the identified paths.

BACKGROUND

Databases are used to store and manage a variety of data and information. Today, databases which contain data and information may be run and maintained on servers or other computers such that the databases may be accessed remotely over a network. A server may run or maintain one or more databases concurrently. For example, a single server may run a specialized database containing a particular type of information while at the same time running a general database containing general information and data. Servers may have access to or serve information or data from the same database.

Various applications may interface with databases maintained on one or more servers over a network. Such applications range from simple client software applications to complete hardware and software Business Information Assurance (BIA) solutions and everything in between. Applications accessing a database over a network may utilize a communications path, i.e. path, specifying the database and database location in a network, thus referencing a specific database. Multiple paths from multiple servers may access a database or multiple databases may be referenced using similar paths. A user such as an administrator may configure paths to databases. If the path or configuration is incorrect, or if the databases or the paths to the databases change, one or more paths may become invalid (by, for example, referencing the wrong database or referencing no database), but users or applications attempting to access databases may be unaware of the invalidity of paths.

SUMMARY

Embodiments disclosed herein provide systems and methods for verifying paths to databases. More particularly, systems and methods disclosed allow for the verification of paths to a database.

Embodiments of methods and systems for verifying paths to databases (which may include, for example, verifying paths or identifying paths to a database) include opening a database utilizing a valid path corresponding to that specific database and creating a database object, such as an alias, in that specific database. To verify other paths which correspond to the database, a path or a set of paths may be used to check for the database object: that is, in one embodiment, the path is used to query the existence of the database object. If the path used to check for the database object corresponds to a database containing the database object, then the path is a valid path referencing the database containing the database object and the path has been verified. If the path does not correspond to a database containing the database object, then the path does not correspond to that database. Furthermore, if it is determined that the path does not lead to any database, then the path is an invalid path. The above process can be repeated for multiple paths and for multiple databases, allowing for the verification of the validity of multiple paths and the correlation of paths with specific databases. For example, the specific paths leading to a specific database can be verified. In one embodiment, verifying paths to databases may be part of a process of synchronizing databases.

Embodiments of methods and systems described above may include a computer software product comprising computer instructions executable to implement the above-described method or portions thereof. The computer instructions of the computer software product may be contained on computer readable media accessible by a microprocessor or other controller such that the computer instructions may be executed by the microprocessor. The microprocessor may be a component of an appliance coupled to a network comprising servers maintaining one or more databases.

Embodiments of systems and methods described herein allow for the verification of paths such that the correlation of specific paths to specific databases is verified. Furthermore, certain embodiments may validate the validity of path to databases. Paths to databases may be verified periodically as part of a synchronization process such that an up-to-date and valid set of paths to databases may be maintained. Furthermore, by intercepting commands containing paths corresponding to databases, databases otherwise unknown to an administrator or other can be identified such that the existence of unknown databases may be ascertained.

These, and other, aspects of the systems or methods disclosed herein will be better appreciated and understood when considered in conjunction with the following description and the accompanying drawings. The following description, while indicating various embodiments of systems or methods and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE FIGURES

A more complete understanding of embodiments of systems and methods and the advantages thereof may be acquired by referring to the following description, taken in conjunction with the accompanying drawings in which like reference numbers indicate like features and wherein.

DETAILED DESCRIPTION

Preferred embodiments are illustrated in the FIGURES, like numerals being used to refer to like and corresponding parts of the various drawings.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Databases containing data or information may be maintained (for example, run or hosted) on servers or other computers such that a single server may maintain one or more databases or portions of databases concurrently and databases may be distributed among one or more servers. A network may be coupled to one or more servers running or maintaining one or more databases such that the databases may be accessed over a network.

Figure 1:
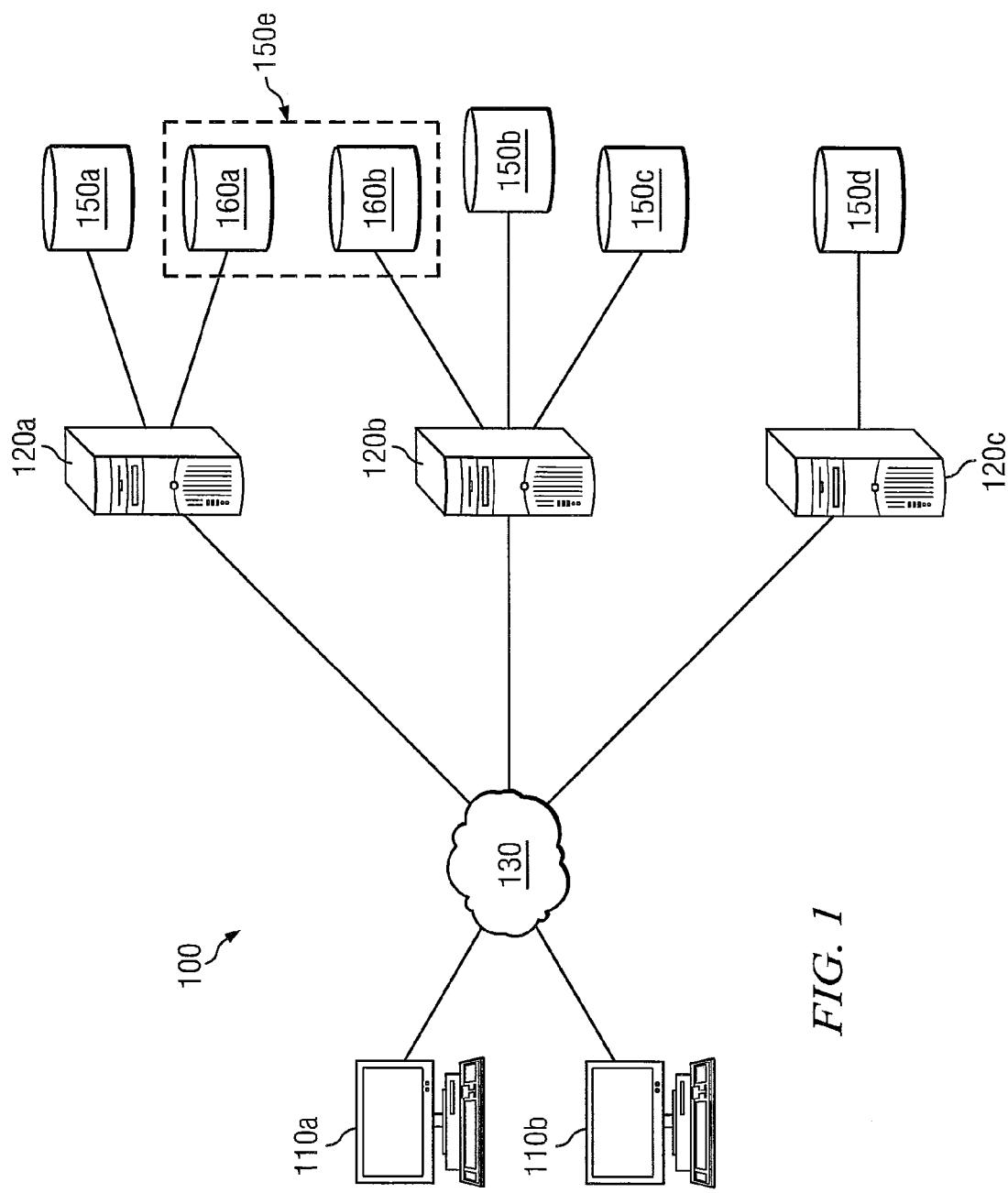
FIG. 1 is a block diagram of an embodiment of a system comprising databases.

FIG. 1 is a block diagram of a system 100 comprising multiple servers maintaining databases. In system 100, server 120a maintains database 150a, server 120b maintains databases 150b and 150c and server 120c maintains database 150d. Together servers 120a and 120b maintain database 150e. Database 150e comprises database portions 160a and 160b which are maintained on servers 120a and 120b, respectively. Hosts 110a and 110b may access servers 120a-120c over network 130 such that users and applications running on hosts 110a and 110b may access individual databases 150 running on servers 120a-120c.

To access a specific database over network 130, it may be necessary to specify a path to the specific database. As databases are shut down, modified or added or servers maintaining databases are shutdown, modified or added, the path to a specific database may change and previously valid paths to a database may become invalid. Similarly, over time, new paths to a specific database may come to exist. In addition, multiple valid paths may exist for the same database such that commands to a single database may traverse one or more valid paths. For example, in system 100, it may be possible for host 110b or applications running on host 110b to access database 150d utilizing more than one path.

In one embodiment, when a database is first created or initialized, an administrator or other may configure a path to the database such that the database may be accessed over a network utilizing the administrator configured path. Subsequently, users or others (such as, for example, computer applications) may utilize the administrator configured path to access the database or may configure additional paths which may be utilized to access the database. As discussed above, because of user error or changes in the network or servers maintaining the databases, paths to databases configured by users or others may be invalid or become obsolete and thus invalid. Paths to databases, database configurations and the databases themselves may also change due to malicious intent. In some situations or system configurations, path indirection can be used to hide malicious database access.

For example, with reference to FIG. 1, in one example, to hide network access, a person can add a new server and make a connection from the newly added server with a pseudo database or other pointer, for example, to database 150a through server 120a. This can be a direct connection between the newly added server and server 120a. Thus, none of the traffic or communications between the pseudo database or other pointer and database 150a will be seen on network 130. Security systems or software monitoring network 130 will not consider access from a host to the pseudo database or other pointer through the newly added server to be dangerous or prohibited. However, such an access is in actuality accessing database 150a. The systems and methods of path verification or validation disclosed herein will catch even this (malicious) attempt at circumventing database security even when all traffic between the newly added server and server 120a is not being monitored.

To verify paths to one or more databases or identify specific paths corresponding to a specific database, the databases may be opened in turn utilizing a known good path (such as, for example, a valid path configured by an administrator or other) and an alias or other database object or structure created in the database. Utilizing each path to be verified, a database may be checked for the existence of the alias or other structure. If a path utilized to check a database for the alias corresponds to a database with the alias, then the path is a valid path to the database. This process can be repeated for each database and for each unverified path to verify the validity of paths and correlate paths with specific corresponding databases. Furthermore, because all paths may be identified by checking for the existence of aliases in databases, all paths to the same database may be determined.

Servers or other computers in a network which maintain databases may have one or more ports for the server or sections of the server and different databases maintained on a server may have different names. Thus, databases maintained on servers in a network may be accessed by specifying a corresponding path with a IP address, Port address and Database name. Various devices (such as, for example: appliances, servers, hosts, etc.) in a network may contain a repository which may contain a list of databases and corresponding paths. Users or computers may access a particular database in a network by addressing the database utilizing a path corresponding to that specific database. In one embodiment, a path may specify a IP address, Port address and Database name corresponding to a database.

A network or portion thereof may comprise a control appliance which controls access to one or more databases maintained on one or more servers, such a control appliance may contain a repository in which paths to databases are maintained. The paths may be organized in a set or otherwise ordered. The control appliance may act as an interface between a network or computers in a network and one or more servers or other computers maintaining one or more databases or a network of servers or other computers maintaining one or more databases. One example of a control appliance and various functionalities which may be implemented by a control appliance is described in U.S. patent application Ser. No. 11/153,873, entitled SYSTEM AND METHOD FOR PROVIDING SERVICE MANAGEMENT IN A DISTRIBUTED DATABASE SYSTEM, by Basiago, Et. Al., filed Jun. 15, 2005, which is hereby fully incorporated by reference herein. An example of a commercially available control appliance is Crossroads StrongBox DBProtector 51000 which is manufactured by Crossroads Systems, Inc. of Austin Tex.

Figure 2:
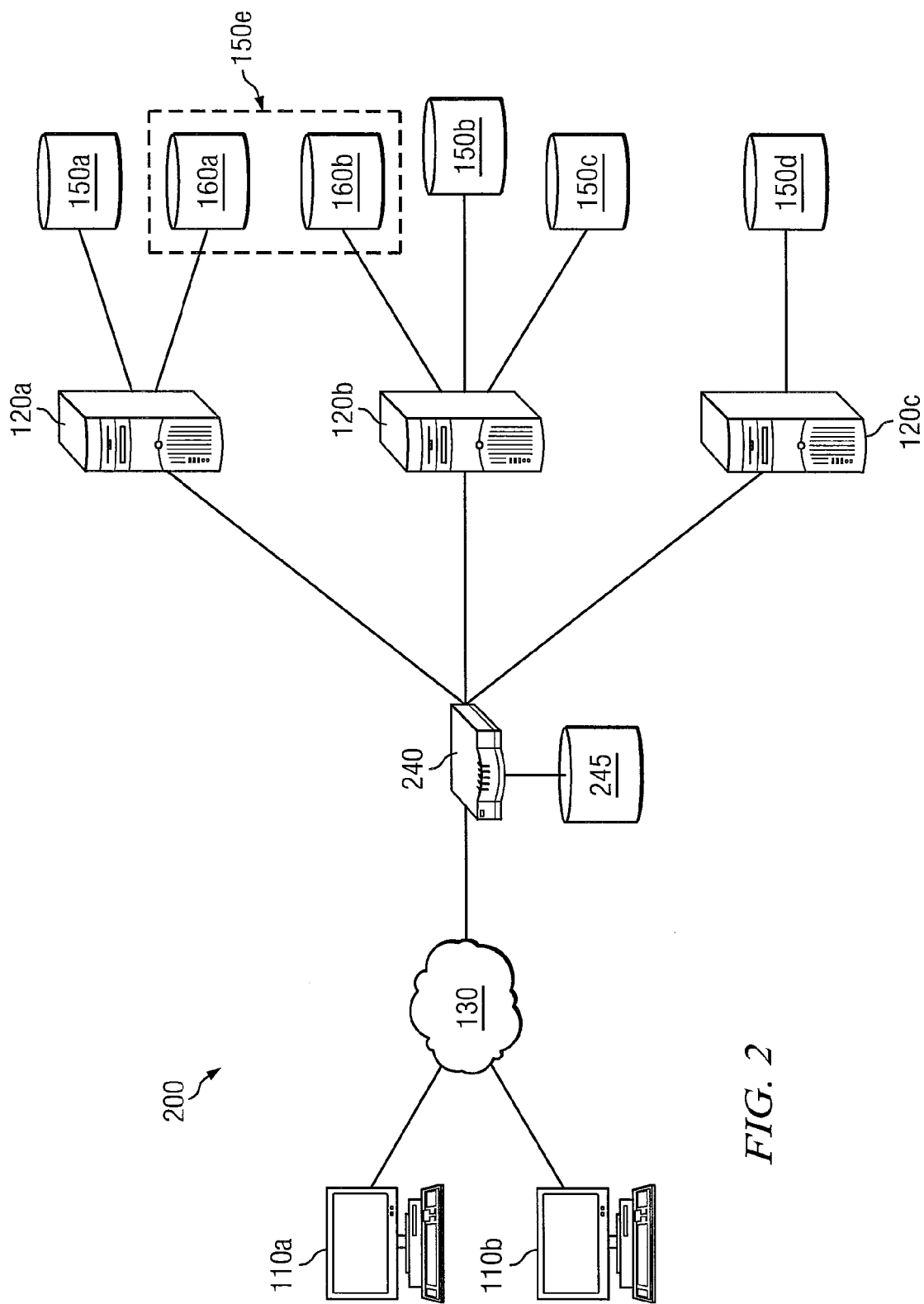
FIG. 2 is a block diagram of an embodiment of a system comprising databases.

FIG. 2 is a block diagram of one embodiment of a system 100 comprising a control appliance such as a DBProtector S1000. In system 100, hosts 110a and 110b may access servers 120a-120c over network 130 through control appliance 240 such that users and applications running on hosts 110a and 110*b* may access individual databases 150 running on servers 120*a*-120*c*. Server 120*a* maintains database 150*a*, server 120*b* maintains databases 150*b* and 150*c* and server 120*c* maintains database 150*d*. Together servers 120*a* and 120*b* maintain database 150*e*. Database 150*e* comprises database portions 160*a* and 160*b* which are maintained on servers 120*a* and 120*b*, respectively.

As shown in FIG. 2, control appliance 240 may provide a central point of control for accessing servers 120*a*-120*c* and databases 150*a*-150*e* maintained on servers 120*a*-120*c* over network 130. As further shown in FIG. 2, control appliance 240 may be coupled to or comprise a repository 245 which may contain a set of paths to databases 150*a*-150*e*. For example, turning to FIG. 4, path list 400 lists a set of paths to databases and may be held in a repository such as repository 245 of FIG. 2.

Returning to FIG. 2, because servers may be added, removed, reconfigured or modified or databases may be added, removed, reconfigured or modified over time, over time, paths contained in repository 245 may become of uncertain validity such that they may not reference a database or reference an undesired or incorrect database. For example, a user or other may input paths stored in repository 245 and these paths may be invalid because they are incorrect or mistaken paths or they may become invalid over time as databases or servers maintaining databases are changed over time and the paths to databases change. To further confuse matters, virtual users, for example, computer programs, may store paths to repository 145, for example, by monitoring commands sent over network 130 for database paths, copying the paths and storing the paths in repository 145. These paths may be invalid or otherwise incorrect and reference the wrong database.

To determine valid paths to a specific database, in this example, database 150*a*, database 150*a* may be opened utilizing a path known (such as, for example, a valid path configured by an administrator) to correspond to database 150*a* and an alias created in database 150*a*. Each path in repository 245 of control appliance 240 may be verified in turn by checking for the alias using the path. The path is used to query a database for the existence of the alias and if the path does not correspond to a database then the path is invalid for all databases. If, however, the case that the path corresponds to a database, but the database does not contain the alias, then the path does not correspond to same database 150*a*. If, in the third case, the database corresponding to the path does contain the alias, then the path is a path to database 150*a* and the path has been verified as corresponding to database 150*a*. The above process may be repeated for each unverified path in repository 245 to verify all paths corresponding to database 150*a*.

The above process of creating an alias in a database and verifying paths may be repeated for each database 150 such that all the paths in repository 245 may be verified and correlated to a database of databases 150*a*-150*e*. Because one or more paths in repository 245 may be demonstrated to be invalid or to correspond to a specific database, the number of paths to be verified will diminish over the process of verifying paths to databases, such that the number of times the above process must be performed to verify all paths in a repository is limited by the number of paths multiplied by the number of databases. While the verification of paths to databases is discussed with regard to a control appliance, this is by way of example, not limitation and functionality for verifying paths utilizing the above process may be implemented on other devices or appliances or may be implemented at a host computer or other computer or in another context where it is desired to verify one or more paths to a database.

Additionally, while the above process has been described with regard to creating an alias or other data structure or pointer in a database, it may be similarly possible to configure, install or define unique data within a database and search for the unique data or configure unique server or system-wide variables associated with a specific database and search for the unique server or system-wide variables. However, in some embodiments, the use of an alias may be desirable because utilizing an alias (which is a database object which may act as a pointer) may allow a database to be identified without putting a significant amount of data (putting a footprint) on the database. Furthermore, the alias or object may be removed or destroyed once one or more paths have been verified, making any effect or footprint on the database transitory (lasting only for the short period of time necessary to verify paths to the database). In its simplest form, an alias may be a pointer or reference to another database object. In one embodiment, an alias may have no information or content in itself. Various forms or types of aliases may include links, references, pointers, synonyms or equivalents. Utilizing a database object or pointer such as an alias ensures minimal actual data is pushed to a database.

It may be desirable to avoid pushing data to a database because pushing data to a database may consume more time than creating a database object such as a pointer as additional I/O operations are generally necessary to push the data or variables to the database. Aliases or other pointers have additional advantages in that they may be common, require no special permission to create in a database, and need no special permissions to query. Aliases are also advantageous in that their use requires minimal rights in the database. The database user used in the process of verifying paths can be highly restricted and the database can remain secure even if this user information is breached. Accordingly, utilizing an alias to verify paths to a database is convenient and unobtrusive.

Figures 3, 4:
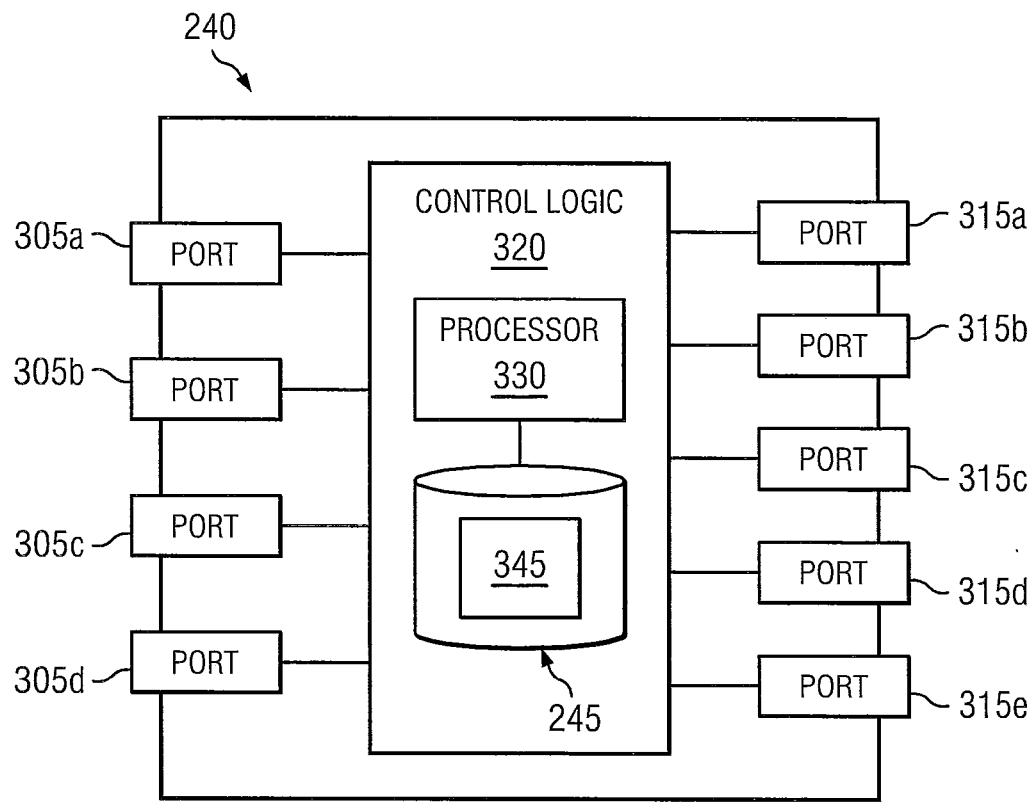
FIG. 3 is a block diagram of an embodiment of a control appliance.
FIG. 4 is a representation of one embodiment of a path list.

FIG. 3 is a block diagram of one embodiment of a control appliance 240 operable to control access over a network to one or more databases. Control appliance 240 may comprise ports 305*a*-305*d* which may be coupled to one or more networks to intercept commands addressed to one or more databases from one or more hosts or computers. Control appliance 240 further comprises ports 315*a*-315*e* which may be coupled to one or more servers maintaining one or more databases and operable to receive data from the one or more servers or forward commands to the one or more servers. Commands received at a port of ports 305*a*-305*d* may be forwarded to control logic 320. Control logic 320 may comprise a processor 330 and a memory 245 containing a path list 345 containing a set of paths. The paths may specify the IP address, Port address and Database name for databases maintained on one or more servers accessible over ports 315*a*-315*e*. Based on paths in the intercepted commands, control logic 320 forwards commands received on ports 305*a*-305*d* to a port of ports 315*a*-315*e* such that a command is sent out a port of ports 315*a*-315*e* corresponding to a server corresponding to the path contained in the command. In one embodiment, control appliance 240 may be accessed over a network by a user (such as, for example, an administrator or other user) who may add, delete or modify paths in path list 345. Control logic 320 may have functionality to monitor network traffic, by, for example, intercepting commands addressed to one or more databases, and copy paths to databases from network traffic and store the copied paths in path list 345 of memory 245.

In an alternative embodiment, an appliance or other device may be passive and may monitor commands addressed to one or more databases rather than intercepting and forwarding the commands to databases. In one embodiment, a passive appliance or other device may be an out-of-band appliance which may not intercept or forward intercepted commands to one or more servers or databases. Embodiments of passive appliances or devices may be used to monitor commands from hosts to servers to detect or investigate network traffic between hosts and servers.

FIG. 4 is a representation of one embodiment of a path list 400 which may be stored or maintained, for example, in memory 245 of FIG. 2. As can be seen from path list 400, each path includes a IP address, Port address and Database name, allowing hosts or applications running on hosts to access specific databases. In path list 400, the paths of entries 410, 420 and 430 are all paths to the same database. The path of entry 410 is an administrator configured path. As such, the path of entry 410 is a known good path which corresponds to a desired specific database. The paths represented by entries 420 and 430 may be other paths created with the intent to access the specific database. Embodiments methods and systems disclosed herein can be used to verify that paths such as paths represented by entries 420 and 430 correspond to a desired database or are valid paths.

Databases may be periodically synchronized and paths to databases verified such that paths may be up-to-date and access desired databases. Control appliance 240 of FIG. 2 may have functionality to synchronize databases which may comprise the verification of paths to databases.

Figure 5:
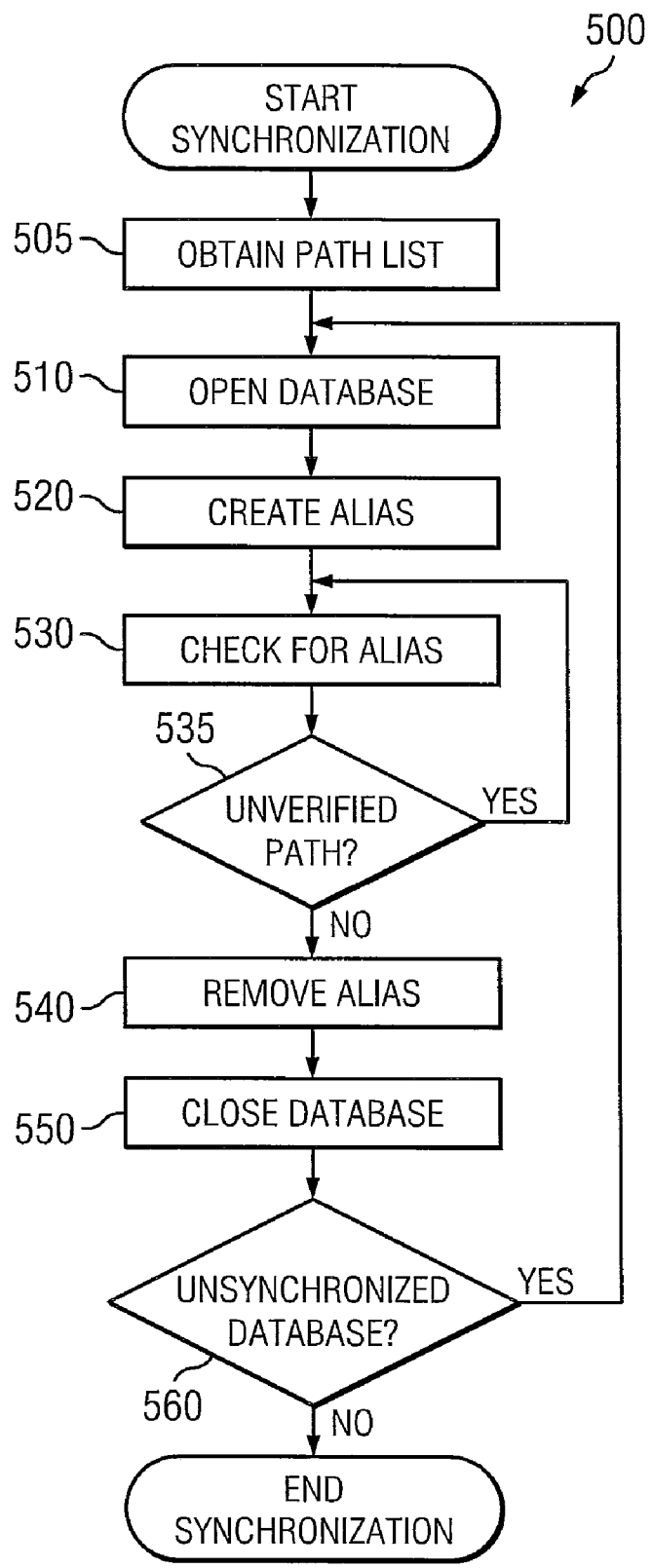
FIG. 5 is a flowchart representing one embodiment of a method for verifying paths to one or more databases.

FIG. 5 is a flow chart illustrating one embodiment of a method 500 for synchronizing databases by verifying paths to databases. According to one embodiment, method 500 of FIG. 5 can be implemented as a set of computer executable instructions stored on a computer readable medium at, for example, control appliance 240 of FIG. 2. The set of computer executable instructions can, when executed, verify paths to databases as part of a process of synchronizing databases. At step 505 of method 500, a path list listing paths is obtained. Such a path list may be a path list such as path list 400 of FIG. 4. At step 510, a specific database in a set of databases is opened. The specific database may be opened utilizing a path known to correspond to that specific database (such as, for example, a valid path configured by an administrator). At step 520, an alias or other database object is created in the specific database. At step 530, an unverified path of the path list obtained at step 505 is used to check for the alias. More particularly, the path may be utilized to query for the alias. If the path corresponds to a database containing the alias, then the path is a path to the specific database, and the path has been correlated to the specific database and verified. If however, the path does not correspond to a database containing the alias, then the path does not correspond to the specific database. In the case that the path does not correspond to a database, the path is an invalid path. At step 535, it is determined if additional paths in the path list require verification, if No, steps 540-560 are proceeded to. If Yes, step 530 is repeated with regard to paths requiring verification.

Subsequent to verifying paths to the specific database, at step 540, the alias or other database object is removed from the specific database. The alias may be removed utilizing any of the paths verified to correspond to that specific database or the path utilized to open the database at step 510 may be utilized. At step 550, the specific database is closed. The database may be closed utilizing any of path which has been verified as corresponding to that specific database or the path utilized to open the database at step 510 may be utilized. At step 560, it is determined whether one or more databases in the set of databases require synchronization: if No, synchronization is ended. If Yes, steps 510-560 are repeated with regard to an unsynchronized database in the set of databases, the unsynchronized database becoming the specific database of steps 510-550 and the paths corresponding to the database are verified. Once all the databases in the set of databases have been correlated to corresponding paths such that the paths to each database in the set of databases have been verified, synchronization ends.

Synchronization of databases can occur periodically such that paths to databases may be identified periodically. Functionality for the synchronization of databases may be a component of a control appliance and may occur in accordance with one or policies. Synchronization of databases may also be performed by an administrator or other user.

In embodiments of systems and methods disclosed herein, individual paths may be verified or sets of paths may be verified. For example, a set of paths which may correspond to a specific database may be verified to determine which paths correspond to the specific database.

While embodiments have been described with particularity, it should be understood that the embodiments are illustrative and that the scope of the invention is not limited to these embodiments. Many other variations, modifications, additions and improvements to the embodiments described above are possible. It is contemplated that these variations, modifications, additions and improvements fall within the scope of the invention as detailed in the following claims.

What is claimed is:

1. A system comprising a memory storing a set of paths and a controller operable to verify paths to a database, verifying paths to the database comprising:
   opening a database utilizing a known path corresponding to the database;
   creating a database object in the database; and
   for each of the paths in the set of paths, verifying the path by attempting to access the database utilizing the path and determining whether the created database object is present in the database accessed utilizing the path, wherein if the created database object is present in the database accessed utilizing the path, the path is verified as a valid path to the database, and wherein if the created database object is not present in the database accessed utilizing the path, the path is determined to be an invalid path.

2. The system of claim 1, wherein the created database object is a temporary database object which is created during the process of verifying paths to the database and removed from the database upon completion of the process of verifying paths to the database.

3. The system of claim 2, further comprising:
   closing the database upon completion of the process of verifying paths to the database.

4. The system of claim 1, wherein determining whether the created database object is present in the database accessed utilizing the path comprises querying for the database object utilizing the path.

5. The system of claim 1, wherein the database object is an alias.

6. A method of verifying paths to a database, comprising:
   opening a database utilizing a known path corresponding to the database;
   creating a database object in the database; and
   for each of the paths in the set of paths, verifying the path by attempting to access the database utilizing the path and determining whether the created database object is present in the database accessed utilizing the path, wherein if the created database object is present in the database accessed utilizing the path, the path is verified as a valid path to the database, and wherein if the created database object is not present in the database accessed utilizing the path, the path is determined to be an invalid path.

7. The method of claim 6, wherein the created database object is a temporary database object which is created during the method of verifying paths to the database, the method further comprising removing the temporary database object from the database upon completion of the process of verifying paths to the database.

8. The method of claim 7, further comprising:
closing the database upon verifying the paths to the database.

9. The method of claim 6, wherein determining whether the created database object is present in the database accessed utilizing the path comprises querying for the database object utilizing the path.

10. The method of claim 6, wherein the database object is an alias.

11. A software product comprising a set of computer instructions stored on a computer readable medium, the computer instructions executable by a computer processor to:
open a database utilizing a known path corresponding to the database;
create a database object in the database; and
for each path in a set of paths, verify the path by attempting to access the database utilizing the path and thereby determine whether the created database object is present in the database accessed utilizing the path, wherein if the created database object is present in the database accessed utilizing the path, the path is verified as a valid path to the database, and wherein if the created database object is not present in the database accessed utilizing the path, the path is determined to be an invalid path.

12. The software product of claim 11, wherein the created database object is a temporary database object which is created by the computer during the process of verifying paths to the database, the software product further comprising computer instructions executable by the computer processor to remove the temporary database object from the database upon completion of verifying the paths in the set of paths.

13. The software product of claim 12, further comprising computer instructions executable by the computer processor to:
close the database upon completion of verifying paths to the database.

14. The software product of claim 11, wherein determining whether the created database object is present in the database accessed utilizing the path comprises querying for the database object utilizing the path.

15. The software product of claim 11, wherein the database object is an alias.

16. A method for synchronizing databases in a set of databases, comprising:
for each database in the set of databases:
opening the database utilizing a known path corresponding to the database;
creating a database object in the database; and
for each of the paths in the set of paths, verifying the path by attempting to access the database utilizing the path and determining whether the created database object is present in the database accessed utilizing the path, wherein if the created database object is present in the database accessed utilizing the path, the path is verified as a valid path to the database, and wherein if the created database object is not present in the database accessed utilizing the path, the path is determined to be an invalid path.

17. The method of claim 16, wherein the created database object is a temporary database object which is created during the process of verifying paths to the database, the method further comprising removing the temporary database object from the database upon completion of the process of verifying paths to the database.

18. The method of claim 17, further comprising:
closing the each database upon completion of verifying paths to the database.

19. The method of claim 16, wherein determining whether the created database object is present in the database accessed utilizing the path comprises querying for the database object.

20. The method of claim 16, wherein the database object is an alias.

* * * * *